United States Patent [19]

Suzuki

[11] Patent Number: 5,371,726
[45] Date of Patent: Dec. 6, 1994

[54] VELOCITY CONTROLLING APPARATUS

[75] Inventor: Haruyuki Suzuki, Yokohama, Japan

[73] Assignee: Ricoh Company, Ltd., Tokyo, Japan

[21] Appl. No.: 50,680

[22] Filed: Apr. 21, 1993

[30] Foreign Application Priority Data

May 1, 1992 [JP] Japan .................................. 4-139747

[51] Int. Cl.⁵ .............................................. G11B 7/00
[52] U.S. Cl. ................................ 369/44.28; 369/44.34
[58] Field of Search ............... 369/44.25, 44.27, 44.28, 369/44.29, 44.34, 32, 54; 360/75, 78.04, 78.05, 78.06

[56] References Cited

U.S. PATENT DOCUMENTS

| | | | |
|---|---|---|---|
| 4,564,929 | 1/1986 | Yonezawa et al. | 369/44.3 X |
| 4,682,315 | 7/1987 | Uejima | 369/45 |
| 4,751,695 | 6/1988 | Kaku et al. | 369/44.34 |
| 4,864,552 | 9/1989 | Getreuer et al. | 369/44.34 |
| 4,873,678 | 10/1989 | Nakamura et al. | 369/13 |
| 4,888,755 | 12/1989 | Itoh | 369/45 |
| 5,031,166 | 7/1991 | Getreuer et al. | 369/44.34 |
| 5,070,494 | 12/1991 | Emoto et al. | 369/112 |
| 5,073,888 | 12/1991 | Takahashi et al. | 369/44.13 |
| 5,095,476 | 3/1992 | Greve et al. | 369/44.28 |
| 5,105,410 | 4/1992 | Maeda et al. | 369/44.37 |
| 5,157,645 | 10/1992 | Takahara et al. | 369/32 |
| 5,189,651 | 2/1993 | Utsumi | 369/13 |
| 5,202,864 | 4/1993 | Moriya et al. | 369/44.28 |
| 5,218,588 | 6/1993 | Suzuki | 369/44.27 |
| 5,222,057 | 6/1993 | Suzuki et al. | 369/44.26 |
| 5,235,577 | 8/1993 | Ogino | 369/44.34 |

FOREIGN PATENT DOCUMENTS

| | | | |
|---|---|---|---|
| 0270357 | 6/1988 | European Pat. Off. | 369/44.34 |
| 233731 | 2/1990 | Japan | G11B 7/085 |
| 2192036 | 7/1990 | Japan | G11B 7/09 |

OTHER PUBLICATIONS

U.S. application Ser. No. 07/891,842, filed on May 29, 1992.

*Primary Examiner*—Aristotelis Psitos
*Assistant Examiner*—Thang V. Tran
*Attorney, Agent, or Firm*—Cooper & Dunham

[57] ABSTRACT

Stable velocity control operations are made possible independent of a circuit constant or the like in digital circuit arrangement. A velocity controlling apparatus comprises a track cross detector, a counter for counting track cross pulses, a sampling device for periodically sampling an output of the counter, and a relative velocity detector for detecting a relative velocity between a light spot and tracks, based upon a difference between a currently sampled value and a prior value sampled by the sampling device prior to the sampling of the currently sampled value. The sampling device periodically samples the output of the counter to count the number of tracks crossed, and a velocity is detected based on the difference, whereby information on detecting velocity may be readily obtained in digital value and the control may be conducted with less errors.

2 Claims, 5 Drawing Sheets

Fig. 5

| Time | VD1 | VD2 | VD3 |
|---|---|---|---|
| 2 | 0 | 0 | 0 |
| 3 | 1 | 0.25 | 0 |
| 4 | 0 | 0.1875 | 0.25 |
| 5 | 1 | 0.391 | 0.1875 |
| 6 | 0 | 0.293 | 0.391 |
| 7 | 1 | 0.470 | 0.293 |
| 8 | 1 | 0.602 | 0.470 |
| 9 | 0 | 0.452 | 0.602 |
| 10 | 1 | 0.589 | 0.452 |
| 11 | 0 | 0.442 | 0.589 |
| 12 | 1 | 0.581 | 0.442 |
| 13 | 1 | 0.686 | 0.581 |
| 14 | 1 | 0.764 | 0.686 |
| 15 | 1 | 0.823 | 0.764 |
| 16 | 1 | 0.867 | 0.823 |
| 17 | 1 | 0.901 | 0.867 |
| 18 | 1 | 0.926 | 0.901 |
| 19 | 1 | 0.944 | 0.926 |
| 20 | 2 | 1.208 | 0.944 |
| 21 | 2 | 1.406 | 1.208 |
| 22 | 1 | 1.305 | 1.406 |
| 23 | 2 | 1.478 | 1.305 |
| 24 | 2 | 1.609 | 1.478 |
| ⋮ | ⋮ | ⋮ | ⋮ |

VELOCITY CONTROLLING APPARATUS

BACKGROUND OF THE INVENTION

1. Field of the invention

The present invention relates to a velocity detecting apparatus and a velocity controlling apparatus in a seek circuit of an optical disk apparatus or the like. More particularly, the invention relates to a velocity detecting apparatus and a velocity controlling apparatus which enable a stable velocity detection operation and a velocity control operation free from influence of circuit constant or the like, in arrangement of digital circuit.

2. Description of the Related Art

A conventional optical disk apparatus is provided with seek means comprising a track pulse generator, which generates a certain number of track pulses every time a light spot focused on an optical disk crosses a track on the optical disk, and a velocity detector for detecting a moving velocity of the light spot from a frequency of the track pulses (see for example Japanese Patent Laying Open (Kokai) Application No. 2-33731).

The conventional optical disk apparatus of this type normally employs a so-called F/V converter, which is a circuit for converting the frequency of track pulses periodically obtained in accordance with the relative movement between the light spot and the tracks, into a voltage in order to detect a relative velocity between the light spot and the tracks on the optical disk.

FIG. 1 is a functional block diagram to show an example of main structure of the F/V converter. In FIG. 1, reference numeral 11 designates a mono multivibrator (MM), 12 an amplifier, 13 a resistor, 14 a condenser, IN an input signal, MMO an output of the mono multivibrator 11, and OUT an output signal of the amplifier 12.

FIG. 2 is a time chart to illustrate an operation of the F/V converter as shown in FIG. 1. Reference characters given for respective signal waves correspond to locations of the characters in FIG. 1.

As shown by MMO in FIG. 2, the mono multivibrator 11 is triggered at each leading edge of the input signal IN to provide an output of pulse with a constant width.

The output MMO of the mono multivibrator is amplified by a subsequent amplifier 12, and the amplifier 12 generates an output signal as shown by OUT in FIG. 2.

The F/V converter is, however, an analog circuit, an output of which may include considerable error elements risen from a dispersion of analog circuit constant and from an offset or a gain error of the amplifier.

Such errors may cause a problem of unstable seek velocity control in the F/V converter.

In addition, the seek velocity control loop itself is an analog circuit basically composed of a an F/V converter, a subtracter, and an amplifier, which is likely to cause errors in hardware and which is also unsuitable for stable velocity control.

SUMMARY OF THE INVENTION

The present invention has solved the above described problems in the conventional velocity detecting apparatus using the analog circuit, and it is an object of the present invention to provide a velocity detecting apparatus and a velocity controlling apparatus constructed with digital circuits free from influence of circuit constant as enabling the stable velocity control.

The present invention first involves a velocity detecting apparatus comprising:
track cross detecting means for obtaining periodic track cross pulses in accordance with a relative motion between tracks on a disk and a light spot;
counting means for counting said track cross pulses;
sampling means for periodically sampling an output of said counting means; and
relative velocity detecting means for detecting a relative velocity between said light spot and the tracks, based upon a difference between a currently sampled value and a prior value sampled by said sampling means in first or further old sampling prior to the sampling of said currently sampled value.

The present invention also involves a velocity controlling apparatus comprising:
track cross detecting means for obtaining periodic track cross pulses in accordance with a relative motion between tracks on a disk and a light spot;
counting means for counting said track cross pulses;
sampling means for periodically sampling an output of said counting means;
relative velocity detecting means for detecting a relative velocity between said light spot and the tracks, based upon a difference between a currently sampled value and a prior value sampled by said sampling means in first or further old sampling prior to the sampling of said currently sampled value;
digital filter means for digitally smoothing a signal of said relative velocity;
target velocity signal generating means for digitally generating a target velocity signal in accordance with an output of said counting means; and
comparing means for digitally comparing said target velocity signal with an output of said digital filter means;
wherein said light spot is driven in accordance with a comparison result of said comparing means.

The present invention further involves a velocity controlling apparatus comprising:
track cross detecting means for obtaining periodic track cross pulses in accordance with a relative motion between tracks on a disk and a light spot;
counting means for counting said track cross pulses;
sampling means for periodically sampling an output of said counting means;
relative velocity detecting means for detecting a relative velocity between said light spot and the tracks, based upon a difference between a currently sampled value and a prior value sampled by said sampling means in first or further old sampling prior to the sampling of said currently sampled value;
target velocity signal generating means for digitally generating a target velocity signal in accordance with an output of said counting means;
comparing means for digitally comparing said target velocity signal with a signal of said relative velocity; and
digital filter means for digitally smoothing a comparison result of said comparing means:
wherein said light spot is driven in accordance with a smoothing result of said digital filter means.

A velocity can be detected in digital arrangement in the velocity detecting apparatus and the velocity controlling apparatus according to the present invention by provision of the relative velocity detecting means which detects a relative velocity between the light spot and the tracks, based upon a difference between a currently sampled value and a prior sampled value sampled by the sampling means in first or further old sampling prior to the sampling of the currently sampled value.

Further, the relative velocity signal thus detected is digitally smoothed to be compared with the target velocity signal, whereby the light spot is driven in accordance with the comparison result, or, the relative velocity signal is digitally compared with the target velocity signal, and the comparison result is digitally smoothed, whereby the light spot is driven in accordance with the smoothed result.

Further objects and advantages of the present invention will be apparent from the following description of the preferred embodiments of the invention as illustrated in the accompanying drawings.

BRIEF DESCRIPTION OF THE DRAWINGS

FIG. 5 is a drawing to show an example of specific numerical values in operation of a digital filter 6 in the velocity detecting apparatus of the present invention.

DESCRIPTION OF THE PREFERRED EMBODIMENTS

The preferred embodiments of a velocity detecting apparatus and a velocity controlling apparatus according to the present invention will be described in detail with reference to the accompanying drawings.

Embodiment 1

Figure 1:
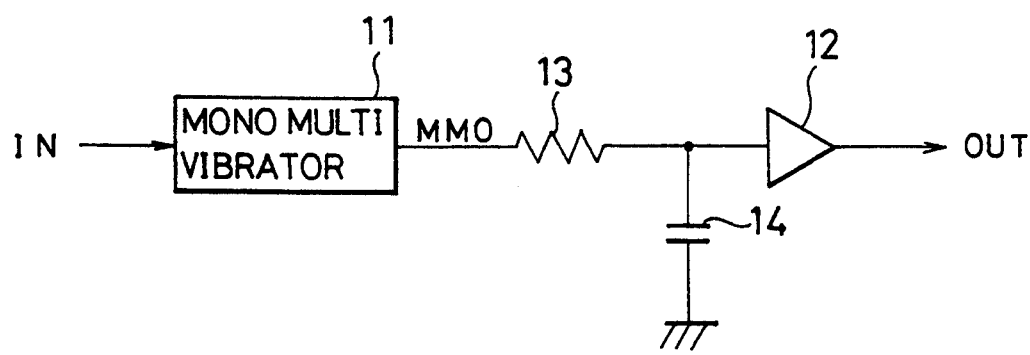
Fig. 1 is a functional block diagram to show an example of main structure of an F/V converter.
Figure 2:
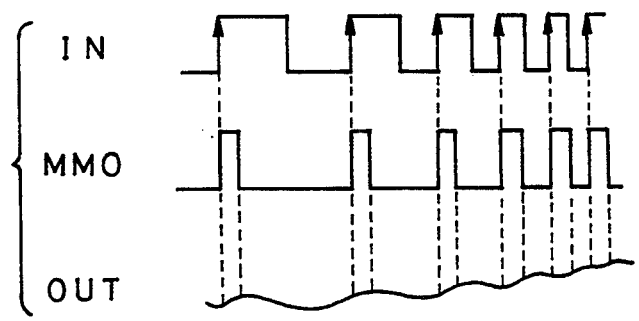
FIG. 2 is a time chart to illustrate an operation of the F/V converter as shown in FIG. 1.
Figure 3:
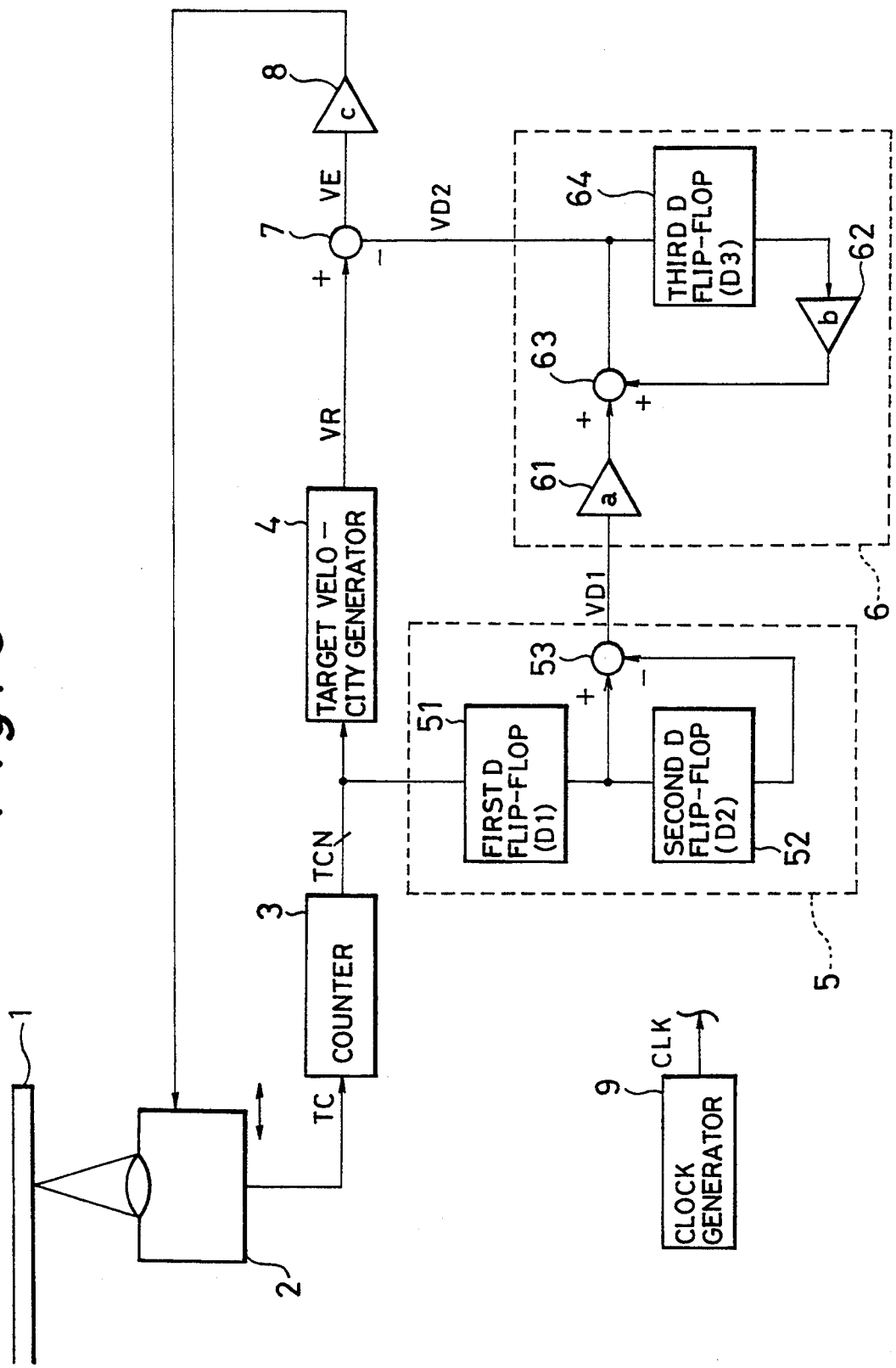
FIG. 3 is a functional block diagram to show an embodiment of main structure of a velocity detecting apparatus according to the present invention.

FIG. 3 is a functional block diagram to show an embodiment of main structure of the velocity detecting apparatus according to the present invention. In FIG. 3, reference numeral 1 designates a disk, 2 an optical head, 3 a counter, 4 a target velocity generator, 5 a velocity detector, 51 a first D flip-flop circuit (D1), 52 a second D flip-flop circuit (D2), 53 a subtracter, 6 a digital filter, 61 an amplifier having a factor a thereof, 62 an amplifier having a factor b, 63 an adder, 64 a third D flip-flop circuit (D3), 7 a comparator, 8 an amplifier having a factor c, 9 a clock generator, TC a track cross pulse, TCN a track cross pulse count number signal output from the counter 3, VR a target velocity signal of the light spot, VD1 a detecting velocity signal, VD2 a detecting velocity signal smoothed, VE an output of the comparator 7, and CLK a clock pulse signal.

First explained is a part of operation of the velocity detecting apparatus according to the present invention as shown in FIG. 3, which is common to that of the conventional apparatus.

A light spot is focused on the disk 1, and the light spot is moved relative to the tracks on the disk 1. The optical head 2 produces track cross pulses TC as well known, in correspondence with the relative movement.

The track cross pulses TC are input into the counter 3, and the pulses TC are consecutively counted at each leading edge and at each trailing edge.

Accordingly, the track cross pulse count number signal TCN output from the counter 3 represents a number of tracks crossed by the light spot.

The count number signal TCN is supplied to the target velocity generator 4 as also known in the art, which outputs a target velocity signal VR of light spot.

The target velocity generator 4 produces for example a difference (remaining tracks) between track number N as a target of movement and the count number signal TCN. In detail, the target velocity generator 4 produces a target velocity signal VR proportional to a square root of (N-TCN).

This relation may be expressed as follows:

$$VR = K_1 * \sqrt{(N - TCN)}, \quad (1)$$

As for the calculation of this relation as expressed by the equation (1), the result of calculation may be stored in the form of table for example in a ROM, or the calculation may be carried out at each occasion in a calculating device such as a CPU.

The above part of operation is substantially same as that in the conventional apparatus.

In the velocity detecting apparatus according to the present invention, the count number signal TCN is also input into the velocity detector 5, which is a constituent element of the relative velocity detector, to obtain a detecting velocity signal VD1.

There is provided inside the velocity detector 5 a sampling circuit for sampling the count number signal TCN in synchronism with a clock signal CLK periodically output from the clock generator 9.

The sampling circuit comprises for example a first D flip-flop circuit 51 and a second D flip-flop circuit 52 in hardware arrangement, and corresponds to means for "reading the count number signal TCN in synchronism with the clock signal CLK to store it in a memory" in software arrangement.

The first D flip-flop circuit 51 and the second D flip-flop circuit 52 are arranged in cascade connection, respective outputs of which are supplied to the subtracter 53 for subtraction therebetween.

The output of the second D flip-flop circuit 52 has a delay of one clock time to the output of the first D flip-flop circuit 51, so that the output of the subtracter 53 may represent a change amount of the count number signal TCN in one clock time, that is, information to show a number of tracks crossed by the light spot in one clock time.

Therefore, the detecting velocity signal VD1, which is the output of the subtracter 53 (output of the velocity detector 5), is an amount proportional to the moving velocity of light spot.

Figure 4:
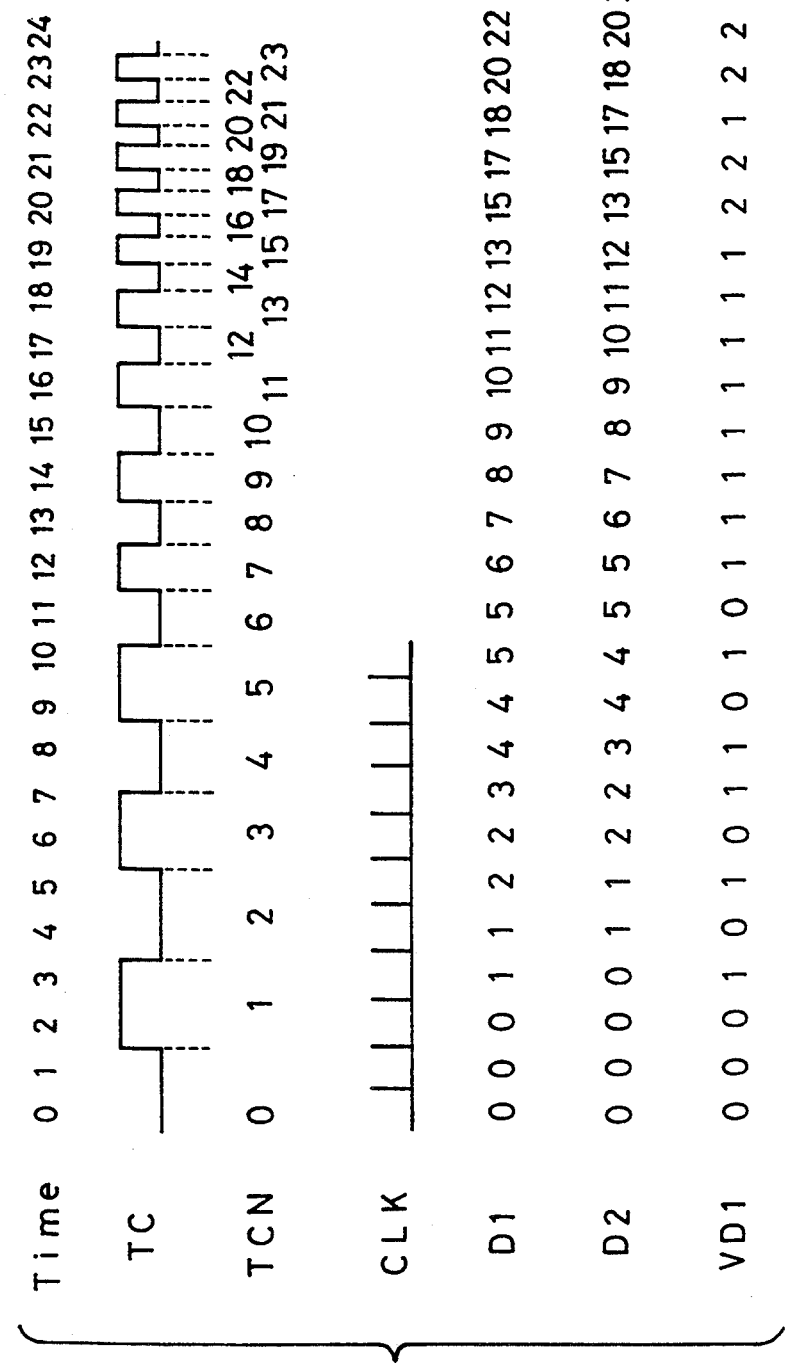
FIG. 4 is a time chart to illustrate an operation of a velocity detector 5 in the velocity detecting apparatus according to the present invention.

FIG. 4 illustrates the above-described operation.

FIG. 4 is a time chart to illustrate the operation of the velocity detector 5 in the velocity detecting apparatus according to the present invention. Reference characters given for respective signal waves correspond to locations of the characters in FIG. 3, and "Time" represents a number of clock signal CLK from the reference of the left end in FIG. 4.

As shown in FIG. 4, a value of count number signal TCN is loaded in D1 (first D flip-flop circuit 51) with each clock pulse CLK.

FIG. 4 shows an example in which when a CLK (clock pulse) is coincident with a change of input of D1 (first D flip-flop circuit 51) or D2 (second D flip-flop circuit 52), a previous D input is loaded in D1 or D2, as in operation of common digital circuit.

For example, at each CLK in Time=1-2, TCN=0 is loaded in D1, and at each CLK in Time=2-3, TCN=1 is loaded in D1.

Since VD1 (detecting velocity signal)=D1-D2, the value of VD1 increases as Time gets larger to increase the frequency (that is, the moving velocity of light spot) of TC (track cross pulse).

The VD1 (detecting velocity signal) thus corresponds to the velocity of light spot, providing information representing the velocity.

In the present invention, the VD1 (detecting velocity signal) is input into the subsequent digital filter 6 in FIG. 3 to be smoothed.

The digital filter 6 has a factor a and a factor b, and is provided with D3 (third D flip-flop circuit 64) as the sampling means for storing an output of the adder 63 in synchronism with CLK (clock pulse).

The adder 63 executes the following calculation:

$$VD2 = a*VD1 + b*D3 \qquad (2).$$

Properties of D3 are the same as those of D1 and D2 as described.

The output VD2 of the digital filter 6 is a detecting velocity signal smoothed, which is compared in the comparator 7 with the target velocity signal VR of light spot output from the target velocity generator 4.

The comparison result is amplified and the amplified result is supplied to a conventional light spot driving device (not shown) comprising the optical head 2, so that the light spot is driven to adjust the velocity into the value according to the target velocity signal VR.

The operation of the digital filter 6 is next illustrated with an example of specific numerical values as shown in FIG. 5.

FIG. 5 is a drawing to show an example of specific numerical values in operation of the digital filter 6 in the velocity detecting apparatus according to the present invention. Reference characters are the same as those in FIG. 3 and FIG. 4.

In FIG. 5, the calculation result calculated using the above equation (2) are listed in the form of table, in which the inputs VD1 (detecting velocity signals) are the same as those in FIG. 4 but aligned in column.

As for Time, values after 2 are shown omitting 0 and 1.

The example is a case in which an initial value of D3 is 0, the factor a=0.25, and the factor b=0.75.

Thus, the above equation (2) may be expressed by the following equation (3):

$$VD2 = 0.25*VD1 + 0.75*D3 \qquad (3).$$

A calculation result with the equation (3) is stored in the third D flip-flop circuit 64 (D3) as D3=VD2, and next "Time" is then awaited.

For example, since D3=0 at Time=3, VD2=0.25 thereat, and since D3=0.25, which is the stored value of VD2 at Time=3, at Time=4, VD2=0.1875 thereat.

The operation is repeated after that, storing each calculation result in the third D flip-flop circuit 64 (D3).

As clearly seen from FIG. 5, VD2 is smoothly smoothed as compared with VD1.

Since VD2 (output of the digital filter 6, that is, the detecting velocity signal) is thus smoothed, there is no steep change in output VE of the comparator 7.

This results in no quick motion in driving of light spot, which permits a stable velocity control.

Moreover, the output VE of the comparator 7 is a digital value, so that there is no analog circuit between the track cross pulse TC and the output VE of the comparator 7, assuring an accurate control.

The drive of light spot in accordance with the output VE of the comparator 7 may be readily carried out for example by converting the output into a voltage through a D/A converter.

In this example, errors may be limited to those caused in the D/A converter and a subsequent drive circuit (not shown) and, therefore, the errors may be greatly reduced, as compared to the conventional method employing the analog circuit for initial velocity detection.

Further, if the output VE of the comparator 7 is modulated through a conventional pulse converter such as PWM (pulse width modulation) circuit then to be directly supplied to the optical head driving means, the control would be performed with less errors.

Embodiment 2

Next explained is another embodiment of the velocity controlling apparatus according to the present invention.

Figure 6:
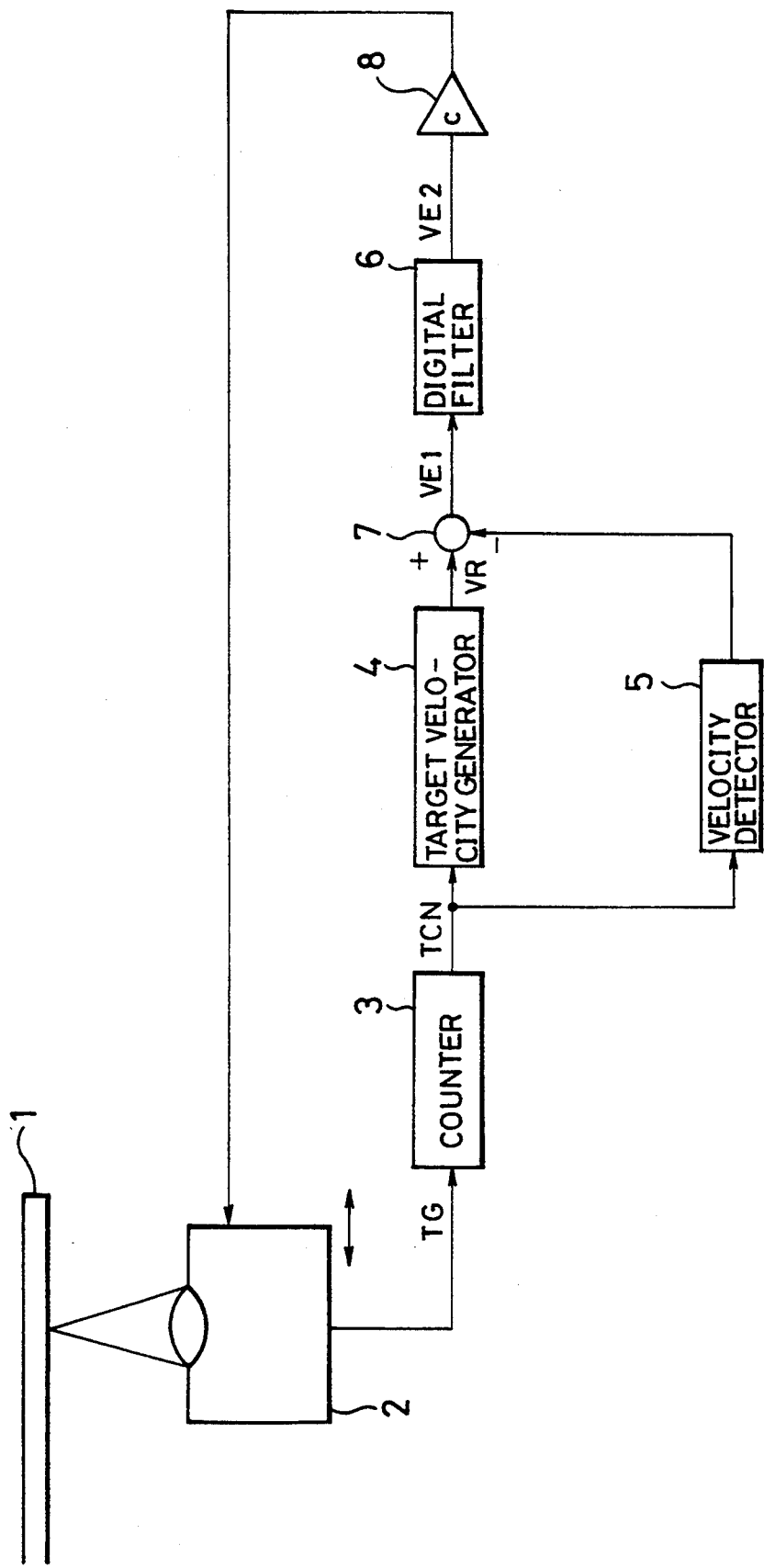
FIG. 6 is a functional block diagram to show another embodiment of the velocity detecting apparatus according to the present invention.

FIG. 6 is a functional block diagram to show another embodiment of the velocity detecting apparatus according to the present invention. The same reference numerals and characters as those in FIG. 3 are used in FIG. 8, in which VE1 represents an output of the comparator 7 and VE2 an output of the digital filter 6.

In the embodiment as shown in FIG. 6, the detecting velocity signal VD1 output from the velocity detector 5 is directly supplied to the comparator 7, which compares the signal VD1 with a target velocity signal VR of light spot output from the target velocity generator 4.

In other words, the detecting velocity signal VD1 is smoothed through the digital filter 6 to be compared in the comparator 7 in the preceding embodiment of FIG. 3, while the detecting velocity signal VD1 and the target velocity signal VR are first compared and the output VE of the comparator 7 (corresponding to VE1 in FIG. 4) as the comparison result is then input into the digital filter to be smoothed in this embodiment.

The embodiment of FIG. 6 may be preferably used in a case in which due to structural restrictions of the target velocity generator 4 the target velocity signal VR of light spot cannot take continuous values but discrete values.

For example, if the operation word length of the target velocity generator 4 is only 8 bits and when the maximum of the target velocity signal VR must be taken to near "255" (that is, in case of an apparatus with a large maximum seek velocity), the target velocity signal VR could express only integral values.

In such a case, if the target velocity signal VR is compared with the detecting velocity signal VD2 as smoothed as in the first embodiment, the output VE1 of the comparator 7 would change by "1" at a timing at which the velocity signal VR changes by "1", which results in a quick change of the driving force to cause unfavorable motion of light spot.

Then, as shown in FIG. 6, the detecting velocity signal VD1 is first compared with the target velocity signal VR, and the output VE1 of the comparator 7, which is the comparison result, is then input into the digital filter 6 to be smoothed, whereby the both signals may be smoothed with moderate change even if one or both of the detecting velocity signal VD1 and the target velocity signal VR are quickly changed.

Consequently, the light spot is favorably controlled in motion without being driven quickly.

The same advantages as those in the first embodiment may of course be enjoyed in the present embodiment because all outputs up to the output VE2 of the digital filter 8 are digital values.

In the present invention, periodic sampling is conducted from the output of the counter for counting the number of crossed tracks, detecting a velocity by the difference thereof.

Thus, the information of detecting velocity may be readily obtained as digital value, enabling the control with less errors.

Further in the present invention, the information of digital detecting velocity is digitally smoothed, whereby enabling the control with less errors and with less quick change in driving force, so as to permit stable and accurate velocity control.

Further in the present invention, the comparison result between the information of digital detecting velocity and the information of digital target velocity is digitally smoothed.

Consequently, even upon large change of target velocity, the control may be effected with less errors and with less quick change in driving force, whereby assuring stable and accurate velocity control.

Many widely different embodiments of the present invention may be constructed without departing from the spirit and scope of the present invention. It should be understood that the present invention is not limited to the specific embodiments described in the specification, except as defined in the appended claims.

What is claimed is:

1. A velocity controlling apparatus comprising:
    a track cross detecting circuit for obtaining periodic track cross pulses in accordance with a relative motion between tracks on a disk and a light spot;
    a counter for counting said track cross pulses;
    a sampling circuit for periodically sampling an output of said counter;
    relative velocity detecting circuit for detecting a relative velocity between said light spot and the tracks, based upon a difference between a currently sampled value and a prior value sampled by said sampling circuit in first or further old sampling prior to the sampling of said currently sampled value;
    a digital filter for digitally smoothing a signal of said relative velocity;
    a target velocity signal generating circuit for digitally generating a target velocity signal in accordance with an output of said counter; and
    a comparing circuit for digitally comparing said target velocity signal with an output of said digital filter;
    wherein said light spot is driven in accordance with a comparison result of said comparing circuit.

2. A velocity controlling apparatus comprising:
    a track cross detecting circuit for obtaining periodic track cross pulses in accordance with a relative motion between tracks on a disk and a light spot;
    a counter for counting said track cross pulses;
    a sampling circuit for periodically sampling an output of said counter;
    a relative velocity detecting circuit for detecting a relative velocity between said light spot and the tracks, based upon a difference between a currently sampled value and a prior value sampled by said sampling circuit in first or further old sampling prior to the sampling of said currently sampled value;
    a target velocity signal generating circuit for digitally generating a target velocity signal in accordance with an output of said counter;
    a comparing circuit for digitally comparing said target velocity signal with a signal of said relative velocity; and
    a digital filter for digitally smoothing a comparison result of said comparing circuit;
    wherein said light spot is driven in accordance with a smoothing result of said digital filter.

* * * * *